July 31, 1934.  H. E. SWIFT  1,968,623
AUTOMOTIVE VEHICLE
Filed May 5, 1932    4 Sheets-Sheet 1

INVENTOR.
H. E. Swift
BY John D. Morgan
ATTORNEY

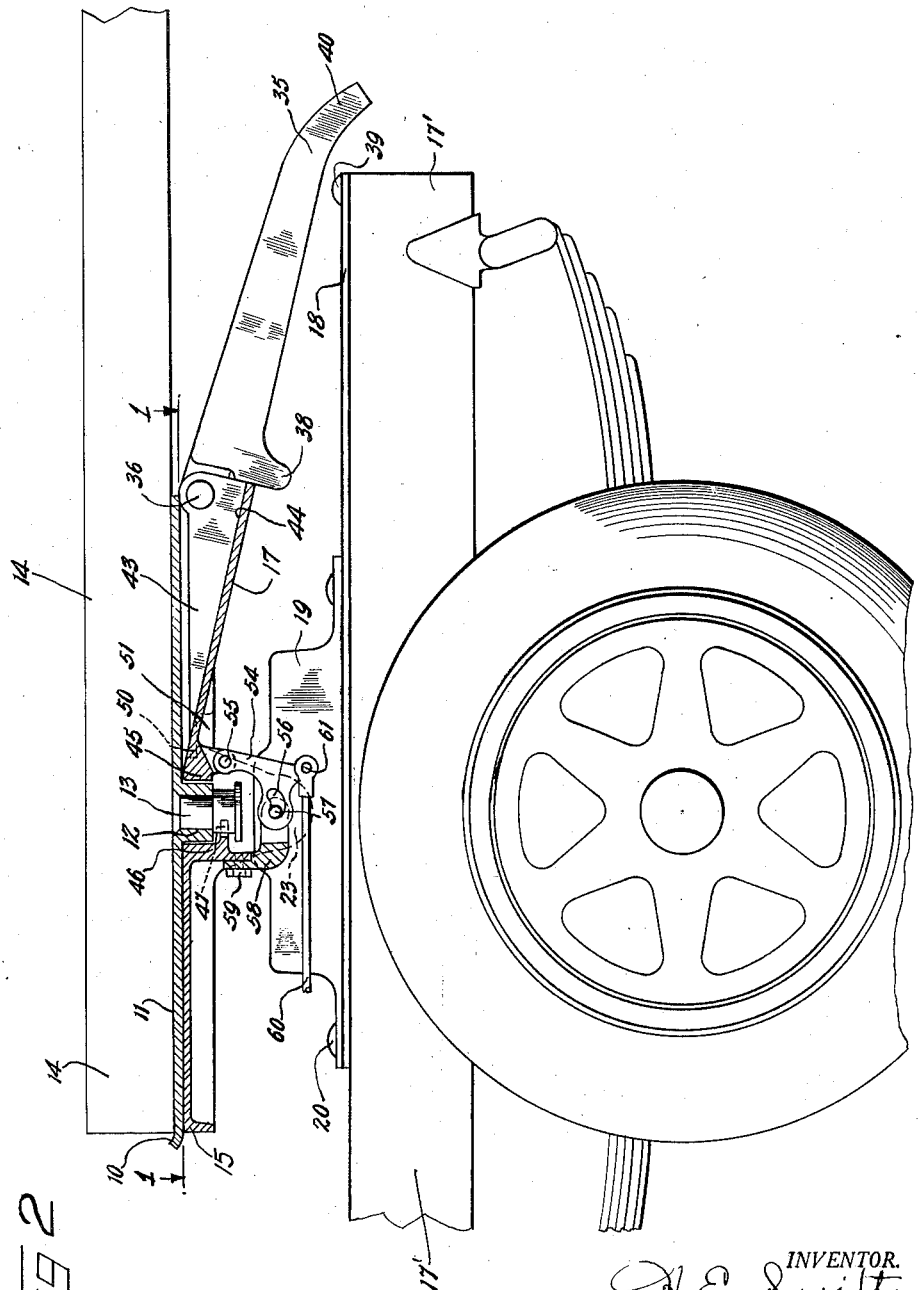

July 31, 1934.    H. E. SWIFT    1,968,623
AUTOMOTIVE VEHICLE
Filed May 5, 1932    4 Sheets-Sheet 3
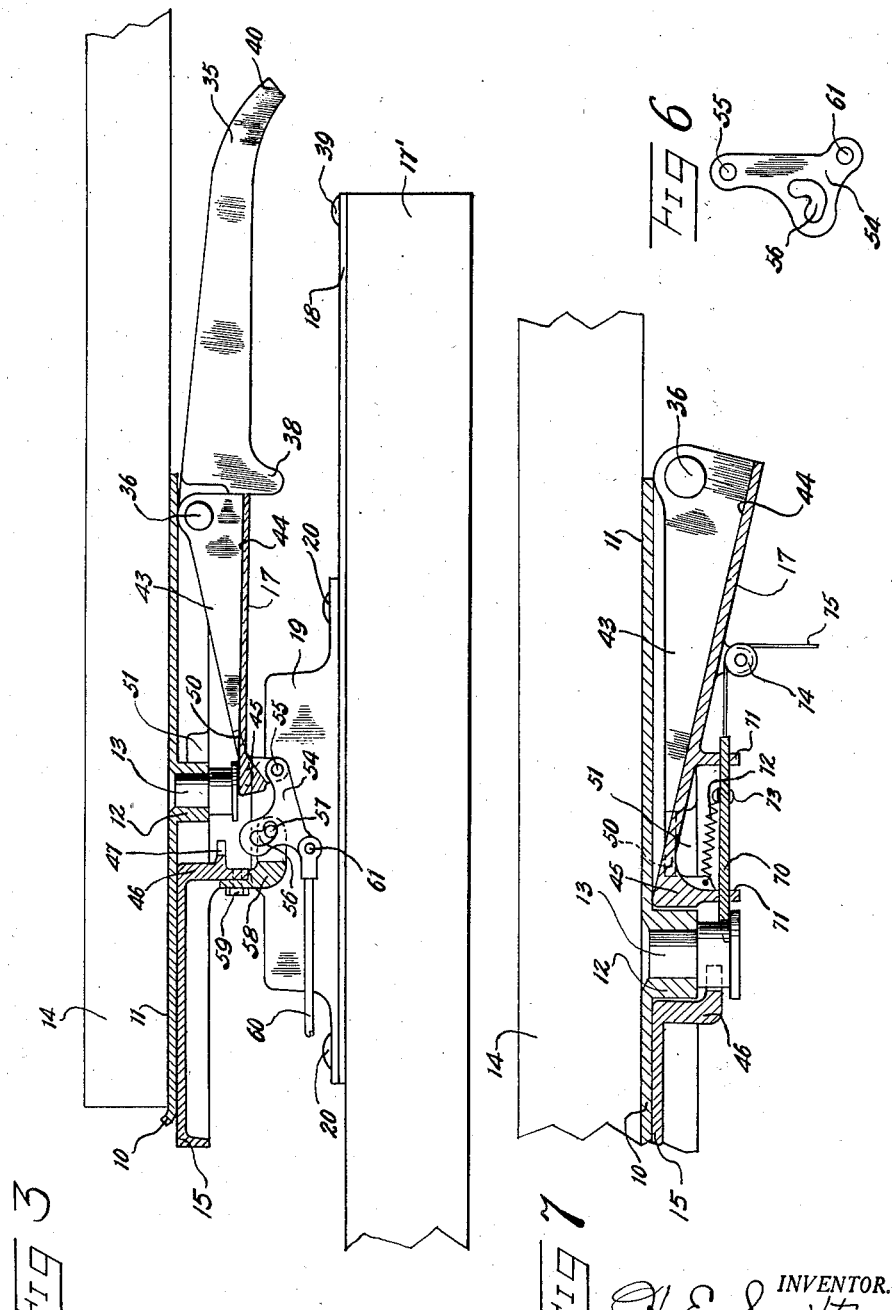

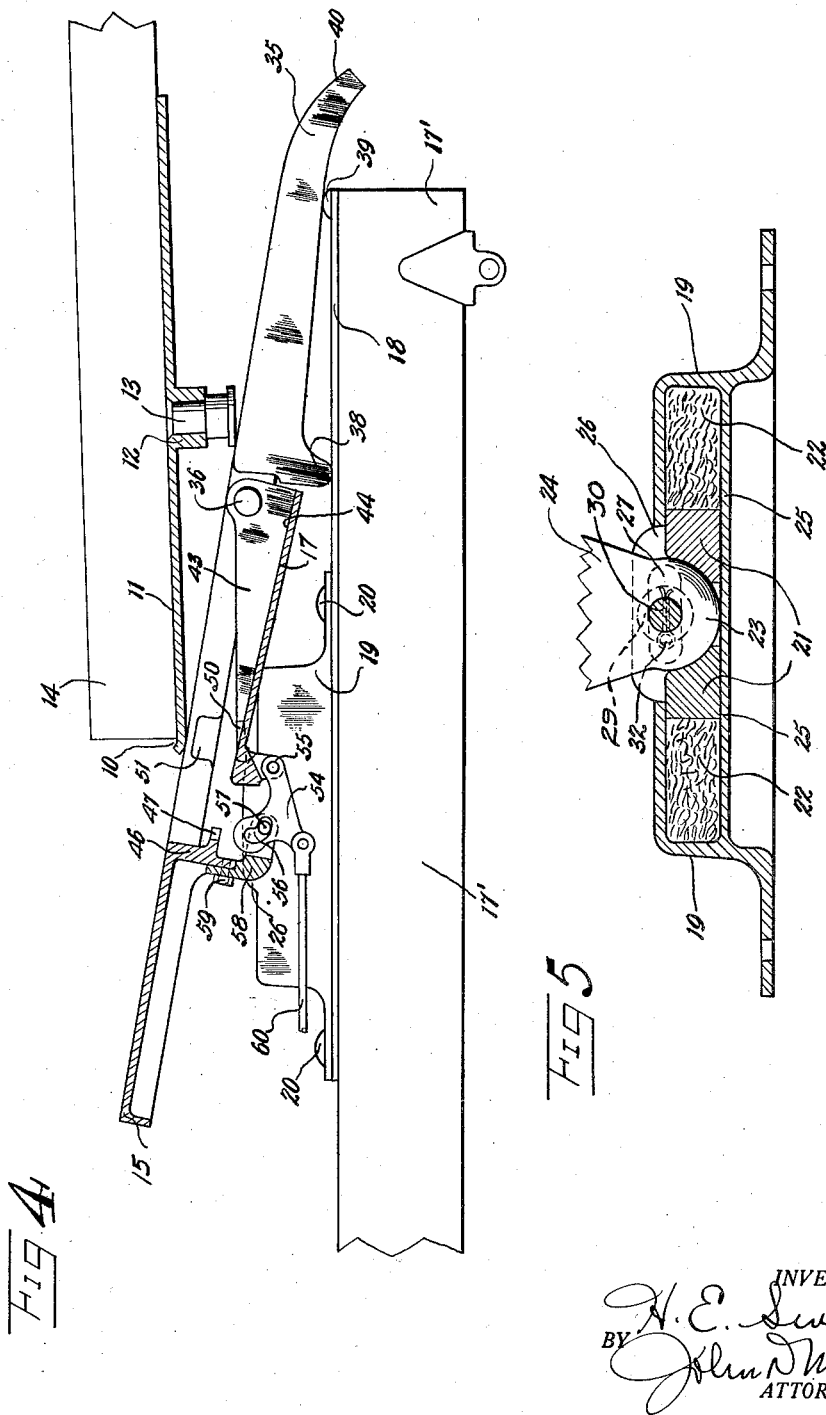

Patented July 31, 1934

1,968,623

UNITED STATES PATENT OFFICE 1,968,623

AUTOMOTIVE VEHICLE

Howard E. Swift, Westfield, Mass.

Application May 5, 1932, Serial No. 609,392

7 Claims. (Cl. 280—33.1)

The present invention relates to automotive vehicles and more particularly to coupling means for coupling a tractor and semi-trailer together in operative relationship.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Of the drawings:—

Figure 2 is a vertical longitudinal section taken on the line 2—2 of Figure 1;

Figure 3 is a view similar to Figure 2 but showing the parts in different operative relationships;

Figure 4 is another view similar to Figure 2 showing a different position of the parts;

Figure 5 is a fragmentary vertical section taken on the line 5—5 of Figure 1 and showing the pivotal connection between the lower fifth wheel member and its supporting brackets;

Figure 6 is a detailed elevation of the lock used in connection with the embodiment shown in Figures 1 to 4 of the drawings; and Figure 7 is a fragmentary, vertical, longitudinal section illustrating a modified embodiment of the invention.

Figure 1:
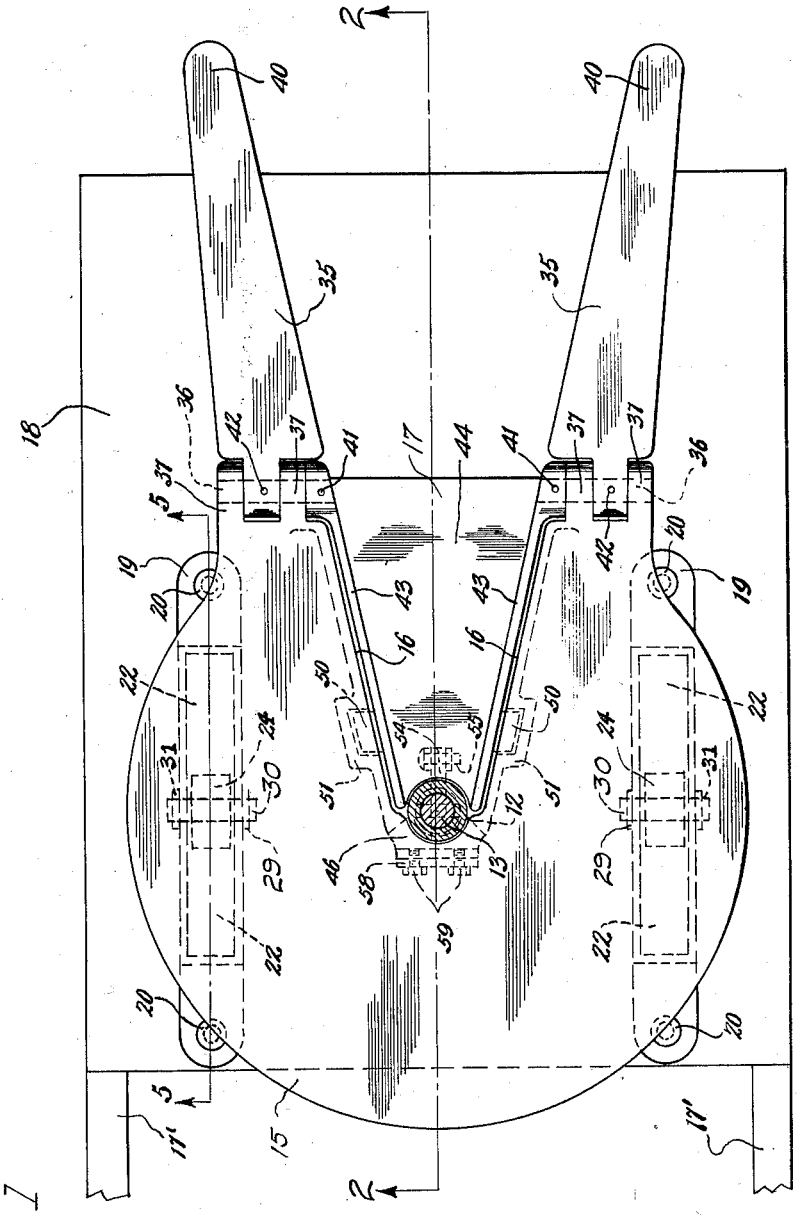
Figure 1 is a horizontal section taken on the line 1—1 of Figure 2.

The present invention has for its object the provision of a novel and improved fifth wheel mechanism for coupling together the tractor and semi-trailer. Another object is the provision of such a mechanism having improved locking means for securing the king-pin against inadvertent displacement during hauling. A further object is the provision of an improved pivotal support for a fifth wheel member. Another object is the provision of an improved fifth wheel member for easily lifting the front end of the semi-trailer during coupling movement from an abnormally low position.

In accordance with the present invention, the coupling means comprises a pair of plate-like, fifth-wheel members adapted to be superposed in running position, one of said members being attached to the front end of the semi-trailer and provided with a downwardly projecting king-pin, while the other of said members is pivotally secured to the upper surface of the tractor and is provided with a central aperture having outwardly divergent sides forming a slot through which the king-pin is moved to coupling position. The lower fifth wheel member is provided with a downwardly depending lug along either side which is seated in a concavity formed in a slidable block held in central position in a supporting bracket by relatively thick blocks of rubber. Compression of the rubber blocks permits the fifth wheel to slide longitudinally of the tractor to absorb the shocks of starting and stopping, while the lugs may rock in their supporting blocks to permit pivotal movement of the fifth wheel. A pin and slot connection is provided between each lug and its supporting bracket to limit relative movement therebetween.

Means are provided for securing the king-pin in coupled position and for this purpose a depressable segment is pivoted in the slot formed in one of the fifth wheels members, and it, together with the king pin is adapted to fill said slot. Means are also provided for securely but releasably locking said segment in king-pin coupling position and for preventing vertical movement of the king-pin sufficient to uncouple the fifth wheel members. For raising the front end of the semi-trailer during coupling and as the tractor is backed beneath said front end, skids are provided alined with the sides of said slot and extending rearwardly from the lower fifth wheel member. These skids are preferably pivotally connected to the rear of the lower fifth wheel member and during coupling are adapted to rest on the rear of the tractor, at which point they are also fulcrumed to permit lifting of the semi-trailer from an abnormally low position. The skids and lower fifth wheel members are preferably so interconnected with the king pin locking segment that they move said segment to locking position by gravity.

It will be understood that the foregoing general description and the following detailed description as well are exemplary and explanatory of the invention but are not restrictive thereof.

Referring now in detail to the illustrative embodiment of the invention as shown in the accompanying drawings, the upper fifth wheel member 10 is of substantially conventional construction and comprises a circular plate or annular ring 11 provided with a central boss 12 from which downwardly projects a king-pin 13. The upper fifth wheel member is secured to the under side of the front end of the semi-trailer frame 14 in accordance with the usual practice.

The lower fifth wheel member comprises a plate 15 of generally circular outline provided with a central aperture to receive the king-pin 13 and opening into a rearwardly enlarging slot formed between side walls 16, through which slot the king-pin is moved to its central position during coupling. The lower fifth wheel member is preferably supported on the upper surface of the rear end of the tractor chassis 17' and may be fastened to a plate 18 extending across the chassis. Means are provided for resiliently and pivotally connecting the lower fifth wheel member to the tractor chassis and for this purpose a pair of brackets 19, parallel to each other and at opposite sides of the lower fifth wheel member, are bolted to plate 18 by bolts 20.

Each of these brackets comprises a pair of longitudinally extending boxes opening towards each other and having their bottom sides in the same horizontal plane. Centrally of the boxes is provided a pair of sliding blocks 21 pressed towards each other by means of rubber compression blocks 22 received within said boxes. Said pair of blocks 21 are formed with adjacent concave or cylindrical surfaces supporting the rounded lower end 23 of lug 24 formed integral with the lower fifth wheel member 15 and depending therefrom. End 23, and blocks 21 are preferably so proportioned that the weight carried by the fifth wheel members will spread the blocks 21 apart, permitting the lower end 23 to rest against the bottom 25 of the boxes formed in bracket 19.

For preventing lateral movement of the fifth wheel with respect to the tractor chassis, brackets 19 are provided with side portions 26 interconnecting the boxes and between which the ends 23 are received. A pin and slot connection is provided for limiting vertical movement of the lower fifth wheel member with respect to its supporting bracket and as embodied, a slot 27 extends horizontally along each side 26, and pin 30 projects through said slots and through an aperture in lug 24. On one end, pin 30 is provided with an enlarged head 31 and is held in proper position by means of washer 29 and cotter pin 32.

This pin and slot connection permits the lower fifth wheel member to have limited movement longitudinally of the tractor against the compression of rubber blocks 22, thereby absorbing shocks of coupling, starting and stopping. The particylindrical ends 23 of lugs 24, cooperate with blocks 21 to permit rocking or pivotal movement of the fifth wheel with respect to the tractor, thereby compensating for the varying angular relations of the tractor and semi-trailer while traveling over uneven roads or changes in grade.

For lifting the front end of the semi-trailer during coupling, or for compressing the springs at the rear of the tractor, as the semi-trailer load is transferred to the tractor during coupling, the lower fifth wheel member is pivotally supported on the tractor chassis and is provided with a pair of rearwardly extending skid members 35 adapted to form an inclined plane to engage and lift the front end of the semi-trailer as the tractor is backed there-beneath. As embodied, skids 35 are pivotally connected to the lower fifth wheel member along its rear edge by means of pivot pins 36 journalled in rearwardly-extending lugs 37 formed integral with the fifth wheel member 15. The adjacent edges of skids 35 are preferably rearwardly divergent and form substantial continuations of the slot edges 16. On their under side, skids 35 are provided with a downwardly extending boss 38, adapted to contact with the plate 18 extending between chassis frame members 17'. Boss 38 is positioned closely adjacent to pivot pin 36 and forms a support for the forward end of skids 35 as well as for the rear portion of lower fifth wheel member 15.

The rearmost portion of skids 35 is preferably curved downwardly for that portion extending beyond the rear end of the tractor, and at or near the rear end of the tractor are provided rubbing plates 39 to contact with the skids. The forward portion of upper fifth wheel 10 is preferably curved upwardly, and whenever the front end of the semi-trailer has sunk or dropped to an abnormally low position, this upwardly curved portion of the upper fifth wheel member engages the downwardly curved portion 40 of skids 35, flexing the parts to the position shown substantially in Figure 2, but with the skid 35 resting against rubbing plates 39. As the tractor is moved rearwardly, the upper fifth wheel member moves forwardly of the lower fifth wheel and along skids 35, moving the parts to the position shown in Figure 4 and reducing the angle of inclination of the skids so that a greater mechanical alvantage is obtained after the load of front end of the semi-trailer has been lifted from the landing gear. This movement of the upper fifth wheel along the skids and upper fifth wheel member 15 continues until the forward portion of upper fifth wheel member 11 is moved in front of rounded end 23 of lug 24. This causes the lower fifth wheel member to be moved to a horizontal position as shown in Figure 3 with its whole area in engagement with the upper fifth wheel member 11. The upper fifth wheel member is then moved to coupling position by continued rearward motion of the tractor and lower fifth wheel member.

Means are provided for securing the king-pin 13 in coupled position after the fifth wheel members have been properly located with reference to each other. For this purpose, segment 17, substantially filling the rearwardly extending slot in lower fifth wheel member 15, is pivotally mounted by means of pivot pins 36, and is fixed with reference to the rearwardly-extending, pivoted skids 35 by means of pins 41 and 42 passing through segment 17 and skids 35 respectively, and their pivot pins 36. Segment 17 is formed with side walls 43 which project upwardly and lie closely adjacent to sides 16 of fifth wheel member 15, and these side walls are connected together by a downwardly and rearwardly inclined portion 44 of segment 17. At its rear end, the flat bottom portion 44 is spaced sufficiently below the pivot pin 36 to permit the king-pin to be moved over it to coupling position. The forward end of segment 17 is shaped to conform to the king-pin 13, and is provided with a thickened portion 45 to increase its strength where it contacts with the king-pin. The central aperture of lower fifth wheel member 15 is also reinforced by an annular portion 46 extending downwardly from the upper surface of the lower fifth wheel and formed integrally therewith. This portion 46 is also provided with a lip 47 adapted to be positioned between the king-pin boss 12 on upper fifth wheel 10 and the enlarged head of king-pin 13, when these parts are in coupled position, thereby limiting relative vertical movement of the two fifth wheel members.

During coupling the segmental portion 17 is moved to a horizontal position by contact of king-pin 13 with its flat bottom 44, and the segment is held in this position until the fifth wheel members are properly positioned for coupling. As soon as the fifth wheel members are positioned properly for coupling, the enlarged head of king-pin 13 passes the end 45 of segment 17 and the weight of skids 35 raises the segment to coupled, king-pin securing position, as shown in Fig. 2. With the parts in coupled relation, the tractive effort of the tractor is transmitted to king-pin 13 and thence the semi-trailer by means of segment 17 and pivot pins 36. Additional strength in this connection may be gained by forming segment 17 with outwardly-projecting lugs 50 which are adapted to engage in downwardly-extending recesses 51 formed in the lower side of lower fifth wheel member 15 along its edges 16.

Means are provided for permitting uncoupling of the fifth wheel members and for locking the king-pin securing member in coupling position. For this purpose a three-armed link 54 is pivoted to a lug formed on the under side of boss 45 by means of pivot pin 55, and link 54 is provided with a C-shaped slot 56, through which passes a pin 57 supported in bracket 58 attached to reinforcing web 46 by means of screws 59. The third arm of link 54 is pivotally connected to an operating rod 60 by pivot pin 61 so that it may be moved to the position shown in Figure 3 from its locking position as shown in Figure 2.

Operating rod 60 is preferably connected with the driver's cab so that it may be moved to and fro by the driver without leaving the cab. By pushing rod 60 rearwardly, link 54 is moved to the position shown in Figure 2, where it securely holds the segment 17 in raised position and prevents its being jarred loose. As the operator pulls rod 60 forward, link 54 is swung about its pivot 55 and slot 56 is moved forwardly to unlocking position. Continued forward movement of rod 60 causes link 54 to pivot around pin 57 pulling segment 17 into the position shown in Figure 3 and thereby releasing the king-pin so that the semi-trailer and tractor may be uncoupled by forward motion of the tractor. Link 54 remains substantially in this position until it is moved to locking position after the next coupling.

Figure 7 of the drawings illustrates a modified embodiment of the invention in which a slidable bolt in engagement with the head of king-pin 13 retains segment 17 in raised or coupled position. As embodied, bolt 70 is slidably mounted on the under side of segment 17 by means of integral guides 71, and is held in forward position by means of tension spring 72, tensioned between boss 45 and stud 73 on bolt 70. The forward end of bolt 70 is preferably concave and conforms substantially to the curvature of king-pin 13. A pulley 74 is freely rotatable on the under side of segment 17 and over it passes a cable 75 connected with the rear end of bolt 70 and running to the operator's cab or other convenient location. Segment 17 is moved to uncoupling position by the operator's pulley on cable 75 which pulls bolt 70 rearwardly and then pulls segment 17 downwardly. In other respects the construction and operation of this modified embodiment is substantially similar to that previously described.

The invention in its broader aspects is not limited to the specific mechanisms shown and described but departures may be made therefrom within the scope of the accompanying claims without departing from the principles of the invention and without sacrificing its chief advantages.

What I claim is:—

1. In a coupling device for automotive vehicles, having a pair of fifth wheel members, one of which has a rearwardly extending slot, the combination of skid-like members pivotally mounted on the rear of one of said fifth wheel members and forming a downwardly and rearwardly inclined extension thereof when the other fifth wheel member is uncoupled, means for securing said king pin within said slot in coupled position and means for operating said securing means by movement of said skid-like members to coupled position.

2. In a coupling device for automotive vehicles, having a pair of fifth wheel members, one of which has a rearwardly extending slot, the combination of a member substantially filling said slot and movable out of the way of said king pin, means for pivotally mounting one of said fifth wheel members including lugs projecting downwardly from the lower fifth wheel member, slidable blocks in which said lugs are rotatable and resilient means opposing movement of said blocks, and means for operating said slot-filling member by pivotal movement of the pivoted fifth wheel member.

3. In a coupling device for automotive vehicles, the combination of a pair of cooperating fifth wheel members, one having a projecting king pin, and the other having a slot through which the king pin may be moved, a member substantially filling said slot and movable out of the way of said king pin, means for lowering said member and weighted means for raising said member to coupling position and means for locking said member in king pin securing position.

4. In a coupling device for automotive vehicles, the combination of a pair of cooperating fifth wheel members, one having a projecting king pin, and the other having a slot through which the king pin may be moved, skid-like members pivotally mounted on the rear of one of said fifth wheel members, means for supporting said skid-like members near their pivot and a fulcrum for said skid-like members to the rear of their pivot.

5. In a coupling device for automotive vehicles, the combination of a pair of cooperating fifth wheel members, one having a projecting king pin, and the other having a slot through which the king pin may be moved, skid-like members projecting rearwardly from one of said fifth wheel members and on which the other fifth wheel member may slide, and means for pivotally supporting said skid-like members at a point near their rear ends and at another point in advance thereof whereby their inclination changes during coupling or uncoupling.

6. In a coupling device for automotive vehicles, the combination of a pair of cooperating fifth wheel members, one having a projecting king pin, and the other having a slot through which the king pin may be moved, skid-like members pivotally mounted on the rear of one of said fifth wheel members and means for securing said king pin within said slot in coupled position by movement of said skid-like members.

7. In a coupling device for automotive vehicles, the combination of a pair of cooperating fifth wheel members, one having a projecting king pin, and the other having a slot through which the king pin may be moved, skid-like members projecting rearwardly from one of said fifth wheel members and on which the other fifth wheel member may slide, and means for pivotally supporting each of said skid-like members at a plurality of points spaced from each other longitudinally of said members whereby their inclination changes during coupling or uncoupling.

HOWARD E. SWIFT.